United States Patent [19]

Makarainen

[11] 4,151,655
[45] May 1, 1979

[54] WHEEL MOUNTING INTEGRITY DEVICE

[76] Inventor: Kauko E. Makarainen, 1366 Rosal La., Concord, Calif. 94521

[21] Appl. No.: 752,670

[22] Filed: Dec. 20, 1976

[51] Int. Cl.² .............................................. G01B 3/12
[52] U.S. Cl. .............................. 33/203.18; 33/174 L; 200/61.44; 340/52 R; 340/58
[58] Field of Search .................. 340/52 R; 200/61.44, 200/61.42, 61.4; 340/58; 33/203.18, 203.19, 203, 174 L; 73/71.2

[56] References Cited

U.S. PATENT DOCUMENTS

| | | | |
|---|---|---|---|
| 2,618,971 | 11/1952 | Herzegh | 73/71.2 X |
| 3,093,812 | 6/1963 | Brown | 340/52 R X |
| 3,535,679 | 10/1970 | Connors | 340/52 R |
| 3,597,728 | 8/1968 | Kurtz | 340/52 R |
| 3,833,094 | 9/1974 | Grossman | 340/52 R X |
| 3,984,808 | 10/1976 | Laz et al. | 340/58 |

Primary Examiner—William D. Martin, Jr.
Attorney, Agent, or Firm—Bielen and Peterson

[57] ABSTRACT

A device to monitor the mounting and bearing integrity of a wheel mounted on an axle where a multiplicity of studs are used each having retainers therefore. A follower of generally dielectric material and having an electrical conductor is biased against the side of the wheel. An electrical contact maintains contact with the follower periphery and is relatively movable between the dielectric periphery and the conductor located in the periphery. The first electrical contact is fixed to the vehicle wheel. Monitor means indicates the electrical connection of the electrical contact and the follower conductor as an indication of the movement of the wheel from its previously fixed position on an axle.

7 Claims, 7 Drawing Figures

WHEEL MOUNTING INTEGRITY DEVICE

BACKGROUND OF THE INVENTION

The present invention relates to a novel device for monitoring the mounting means and wheel bearing integrity on axle wheels particularly useful for vehicles, manufacturing apparatuses and like bodies.

Wheels secure to vehicles by the expedient of wheel axle retaining nuts, and wheel stud nuts in the most common instances. Constant turning of an axle mounted wheel results in wear and tear on the component holding the wheel in place. Axle mounted wheels are often subjected to punishment as a consequence of travel on rough and/or uneven surfaces. Other factors such as exposure to the elements, manufacturing defects, drayage of heavy cargo, metal fatigue and the like tend to cause failure of the integrity of a wheel mounting.

The prior solution to the failure of a wheel mounting has been frequent inspections, preventive maintenance, employment of superior materials and lubrication, quality control in manufacturing and other piecemeal tasks. Despite these expensive and time consuming efforts, failure of wheel mountings often occurs with disasterous or near disasterous effects.

The remaining unsolved problem has been the lack of a means to monitor or obtain information on a wheel mounting while the wheel is in operation. Reference is made to my copending United States Patent Application, Ser. No. 660,455, filed Feb. 23, 1976 which describes an advance in the art of monitoring pneumatic pressure while a pneumatic tire or pneumatically inflated body is in motion or otherwise difficult to approach.

No known device, apparatus, or method has been disclosed which teaches a solution to the aforementioned problem.

SUMMARY OF THE INVENTION

In accordance with the present invention a novel and useful device for monitoring the mounting and bearing integrity of a vehicle is provided. The invention may be further deemed to include a device which telemeters the torque and general integrity of a wheel stud.

The device in its most basic form utilizes a first follower which has a dielectric periphery. The first follower contacts the wheel. An electrical conductor spans or traverses the periphery of the first follower, thus interrupting a portion of the dielectric surface with conductive material. A first biasing means, such as a spring, hydraulic lever and the like urges the first follower into contact with the wheel. A first electrical contact touches the periphery of the first follower and moves therealong, by sliding, skidding, and the like. The first follower and first electrical contact move relative to each other such that the first electrical contact may electrically connect, touch, or contact the electrical conductor of the first follower. A guid or like mounting would support the follower. The first electrical contact would be fixed to the axle a selected distance outwardly therefrom.

Monitor means would indicate the electrical connection of the first electrical contact and the first follower electrical conductor. This event would occur when there is relative movement between the wheel and axle upon the loosening or breakage of the stud, or stud retainer. The monitor means may include a second follower having a third electrical contact electrically connected to the first follower's electrical conductor. A second biasing means would urge contact of the second follower with an electrically conductive rotor. The first and second biasing means may be a single spring means located between the followers, and pushing the followers apart. The electrically conductive rotor may have a first and second side and be disposed about or circumjacently in relation to the wheel axle. The rotor would rotate with the wheel. The third electrical contact of the second follower would electrically touch the first side of the rotor. The first electrical contact would connect to electrical ground, simply referred to as "ground" hereinafter.

Indicator means such as a light, horn, bell, meter, and the like would signal the electrical connection between the first follower's electrical conductor and the first electrical contact. A power source complete a circuit having as its elements the first electrical contact, first follower's electrical conductor, third electrical contact of the second follower rotor and indicator means. A second electrical contact spaced from the first electrical contact and away from the wheel could be used to test the monitoring device. A push rod connected to the first follower would oppose the urging of the first biasing means to bring the second electrical contact into electrical connection with the electrical conductor of the first follower.

The invention also embraces a device to monitor the axle bearing integrity which has a rotor disposed about the wheel axle. A riding member contacts the rotor. An electrical conductor spans the riding member much in the same manner as the first follower. One electrical contact touches the periphery of the riding member and may travel relative to the riding member much in the same manner as the first follower. One electrical contact touches the periphery of the riding member and may travel relative to the riding member to electrically connect or touch the electrical conductor of the same. The one electrical contact is fixed to the body holding the axle and wheel. Forcing means would push the riding member against the rotor. Alerting means would indicate or signal electrical connection of the one electrical contact and the electrical conductor of the riding member. Thus, any relative movement between the body and the axle, such as failure of the axle bearing be detected by this device. A similar circuit to the previous one described in relation to the first follower would result with the addition of another electrical contact which would coordinate to touch the electrical conductor of the riding member at the same time as the one electrical contact. A signal means in combination with the one electrical contact, electrical conductor of the riding member, another electrical contact and a power source would complete this circuit.

The riding member may be combined with the first and second followers utilizing the electrically conductive rotor in the first instance as a common rotor. The riding member having a foruth electrical contact would contact the second side of the rotor and transmit the electrical signal through a first electrical conductor to a fifth contact touching the periphery of the riding member. A second electrical conductor of the riding member spanning its periphery would bridge the one and another electrical contacts to indicate axle integrity. A pull rod connected to the riding member would exert a force opposite to a third biasing means.

The invention also includes a stud retainer torque and retainer integrity monitor which uses a dielectric collar placed around a wheel stud retainer. An electrically conductive segment in the collar is connected to ground. An electrically conductive sensing wire would bear on the collar such that any twisting of the retainer would effect contact of the wire and conductive segment. A tensing means would urge contact of the wire and collar. Monitor means consisting of a power source, indicator and conduit between the electrically conductive rotor would signal contact of the wire with the conductive segment of the dielectric collar. A ground conductive boss place adjacent the collar and inward toward the center of the wheel would contact the wire upon complete failure of the stud and retainer.

It is therefore an object of the present invention to provide a novel wheel mounting integrity monitor which detects failure of wheel stud retainers, axle retainers and axle bearings in an axle mounted wheel.

It is another object of the present invention to provide a wheel mounting integrity monitor easily installed and tested for use.

It is yet another object of the present invention to provide a wheel mounting integrity monitor concerned with multiple aspects of wheel mounting failures.

The invention possesses other objects and advantages especially as concerns particular features and characteristics thereof which will become apparent as the specification continues.

Various aspects of the present invention will evolve from the following detailed description of the preferred embodiments thereof which should be taken in conjunction with the accompanying drawings.

DESCRIPTION OF THE PREFERRED EMBODIMENTS

Figure 1:
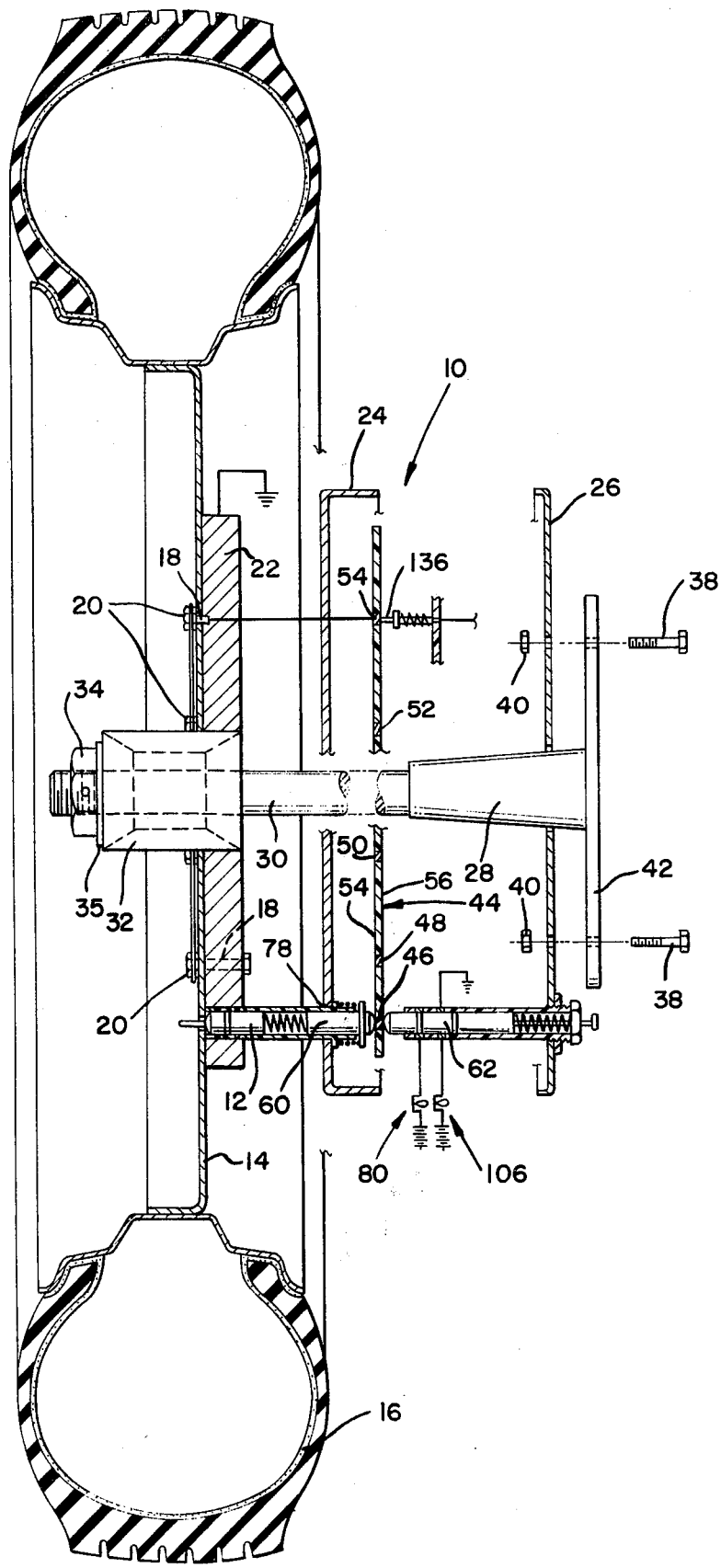
FIG. 1 is a partially exploded sectional view of the device.

The invention as a whole as shown by the drawings is indicated by reference character 10 and includes as one of its elements a first follower 12, FIG. 1. The first follower 12 contacts the wheel 14 having a pneumatic tire 16 therearound. A plurality of studs 18 having retainers 20 such as nuts, hold wheel 14 to wheel hub 22. The wheel mounting also includes brake drum 24, brake backing plate 26, as well as the wheel axle spindle 28 and axle 30. The axle 30 include axle bearing 32 which is held by wheel axle 30. Studs 38 and nuts 40 affix the brake backing plate 26 to the body 42.

A rotor 44 may have electrically conductive portions 46, 48, 50, 52, and 54 and includes a first side 56 and a second side 58. In general, a second follower 60 and riding member 96 contact conductive portion 54 of rotor 44, as will be explained in greater detail as the specification continues.

Figure 2:
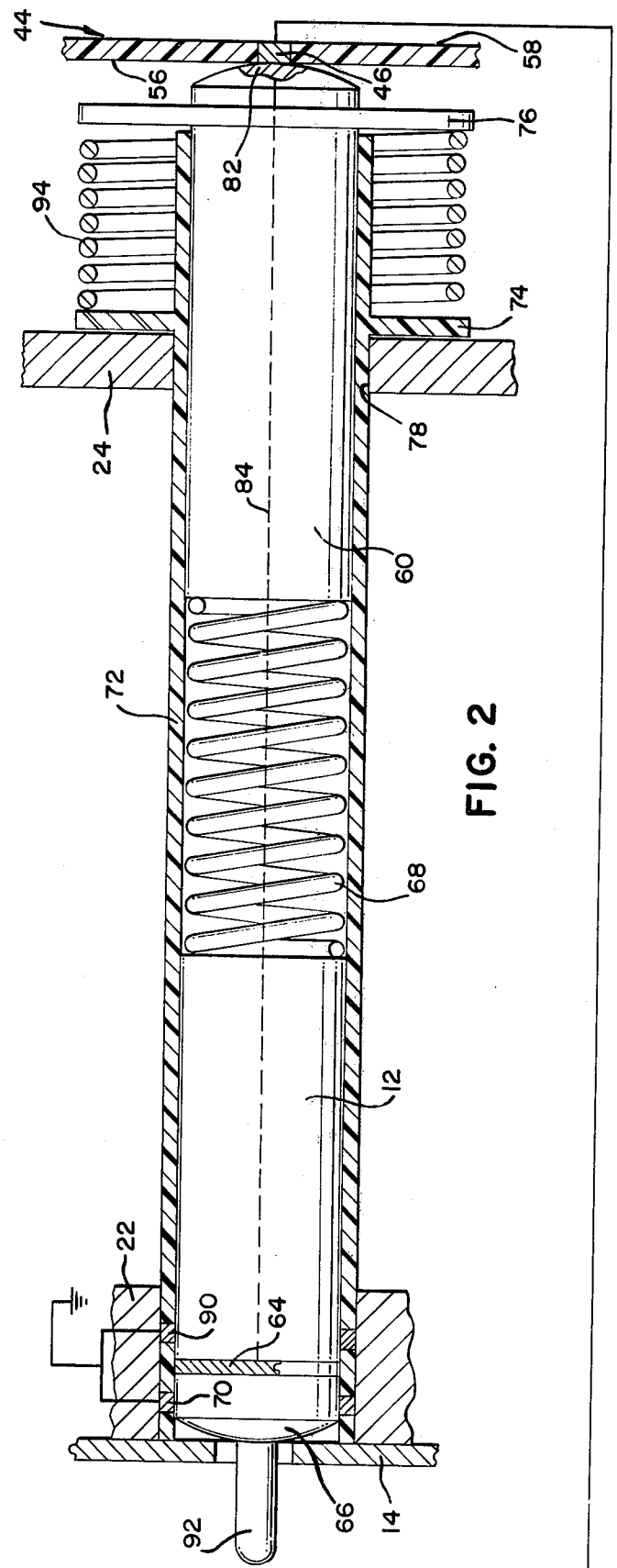
FIG. 2 is a sectional view of the first and second followers of the device.

Turning to FIG. 2, an illustration of first follower 12 and second follower 60 is provided. First follower 12 has a dielectric periphery except where electrical conductor 64 spans the periphery. The end 66 of first follower 12 contacts the wheel 14. First biasing means 68 urges first follower 12 into contact with wheel 14. First electrical contact 70 grounds and touches the periphery of follower 12. Follower 12 moves within guide 72 which contains first electrical contact 70. The guide 72 includes shoulder 74 and a fixed shoulder 76. Guide 72 fixes to brake drum 24 by snuggly fitting within opening 78. Thus, first electrical contact 70 moves relative to follower 12 with the lateral movement of wheel 14, between the dielectric periphery first follower 12 and electrical conductor 64. In the present embodiment, follower 12 would move laterally, motivated by biasing means 68, if wheel 14 moved in the same direction. First electrical contact 70 is essentially fixed to axle 30 through brake drum 24 which is itself affixed to axle 30.

Monitor means 80 would indicate electrical connection of the first electrical contact 70 and first follower electrical conductor 64. Monitor means 80, in its basic format, includes second follower 60 having third electrical contact 82, linked to conductor 64 via conduit 84, shown in broken lines on FIG. 2 third electrical contact 82 would contact first side 56 of rotor 44 which is disposed about the axle 30 to axially rotate with the axle 30. Second biasing means 86 urges contact of third electrical contact 82 to side 56 of rotor 44. Indicator means 86, shown as a warning light on FIG. 3, would signal the electrical connection between conductor 64 and first electrical contact 70 when wheel 14 shifts position because of a loosened or broken retainer 20 or stud 18. Power source 88, depicted in the drawings at a plurality of positions, is to be considered a single source of electrical energy. Likewise, electrical grounds shown symbolically are to be intended of a single ground.

The device 10 also has a second electrical contact 90 located in cylindrical guide 72 spaced away from first electrical contact 70 and wheel 14. First test member 92 may be pushed to force follower 12 against the force of biasing means 68. Alignment of conductor 64 and second electrical contact 90 would light indicator means 86 as proof of the workability of the device 10.

Guide 72 has a shoulder 74 which receives a force from spring 94, which itself bears on a fixed shoulder 76. Thus, guide 72 is positioned against wheel 14 to hold electrical contacts 70 and 90 in a fixed relationship therewith. Shoulder 76 may be fixed to brake drum or otherwise fixed to axle 30.

Figure 3:
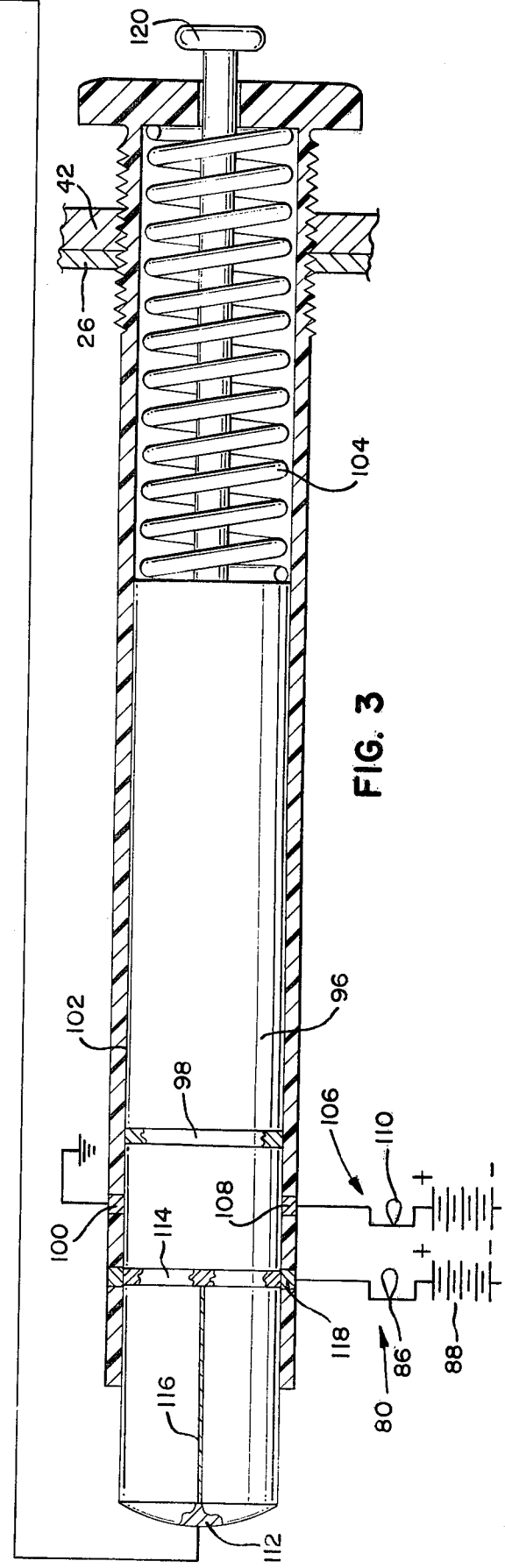
FIG. 3 is a sectional view of the riding member of the device.

The bearing 32 integrity may be monitored by the use of riding member 96 bearing on rotor 44, FIG. 3. Electrical conduit or second conductor 98 of riding member 96 spans the periphery of an otherwise dielectrical member 96. One electrical contact 100, connected to ground, touches and relatively moves in relation to the periphery of riding member 96. In other words, conductor 98 moves to contact 100 with lateral movements of rotor 44. Contact 100 is part of guide 102 which threadingly engages brake backing plate 26.

As may be apparent, electrical contact 100 is fixed in relation to body 42 thereby. Forcing means 104 insures the contact of riding member 96 on rotor 44. Alerting means 106 indicates the electrical connection of contact 100 with conduit 98. Such alerting means 106 may include another electrical contact 108 touching the periphery of follower 96. In practical construction, the contact 100 and 108 must be isolated from one another.

Electrical conduit 98 and contacts 100 and 108 are relatively movable with the notion of riding member 96. Failure of bearing 32 would cause rotor 44 to move laterally away from body 42, and thus simultaneously permit contact of conductor 98 to contacts 100 and 108. This event would activate signal means 110 connected to power source 88.

Followers 12 and 60 may combine with riding member 96 to form an integrated monitor of the wheel mounting integrity. Riding member 96 may include a foruth contact 112 electrically contacting the second side 58 of rotor 44, most clearly shown in FIG. 1, at conductive portion 46. A first electrical conductor 114 spans the periphery of riding member 96 in the same manner as conduit or second conductor 98. A conduit 116 connects fourth electrical contact 112 with conductor 114. Third biasing means, identical to forcing means 104, insures electrical connection of contact 112 and conductive portion 46 of rotor 44. Fifth electrical contact 118, touching the periphery of riding member 96, is fixed in guide 102 and therefore fixed to body 42; in similar fashion to contacts 100 and 108. Thus, the circuit previously formed in relation to followers 12 and 60 originating with first contact 70 and continuing with conductor 64, conduit 84, contact 82, rotor 44 and its conductive portion 46, and indicator means 86 can be included with the bearing integrity monitor heretofore described. As shown in FIGS. 2 and 3, the conductive portion 46 would connect to contact 112, conduit 116, first conductor 114, contact 118, before connecting to indicator 86. The riding member 96 would be disposed to such that conductor 114 opposes contact 118, thus permiting followers 12 and 60 to operate independently of riding member 96. It should be noted that rotor 44 would remain fixed if retainers and/or studs 20 and 18 were to fail.

A second test member 120 would allow the pulling of riding member 96 against forcing means 104 to test signal means 110. In this case, conductor 118 would align with contacts 160 and 108.

Figure 4:
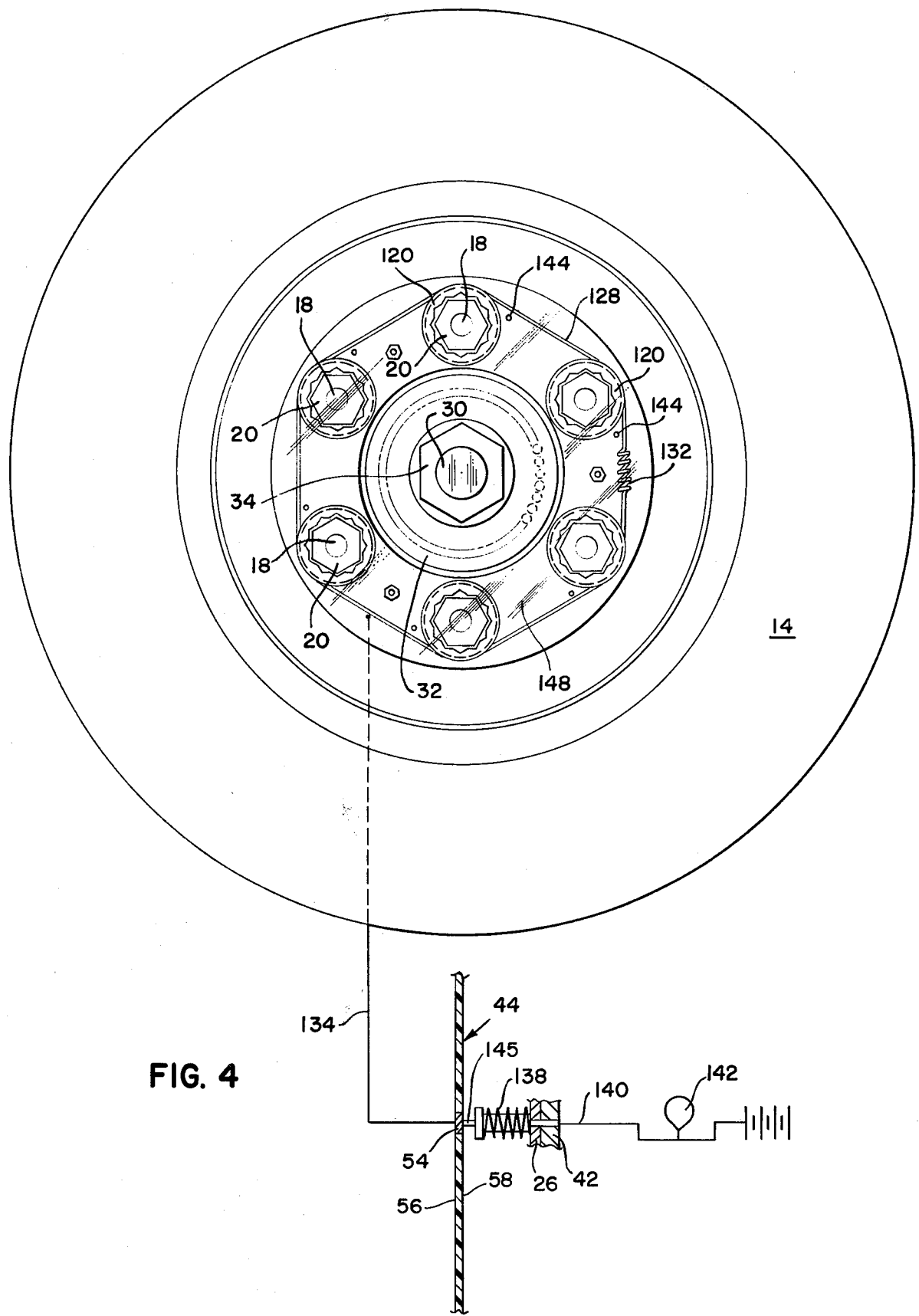
FIG. 4 is a side view of an embodiment of the invention.
Figure 5:
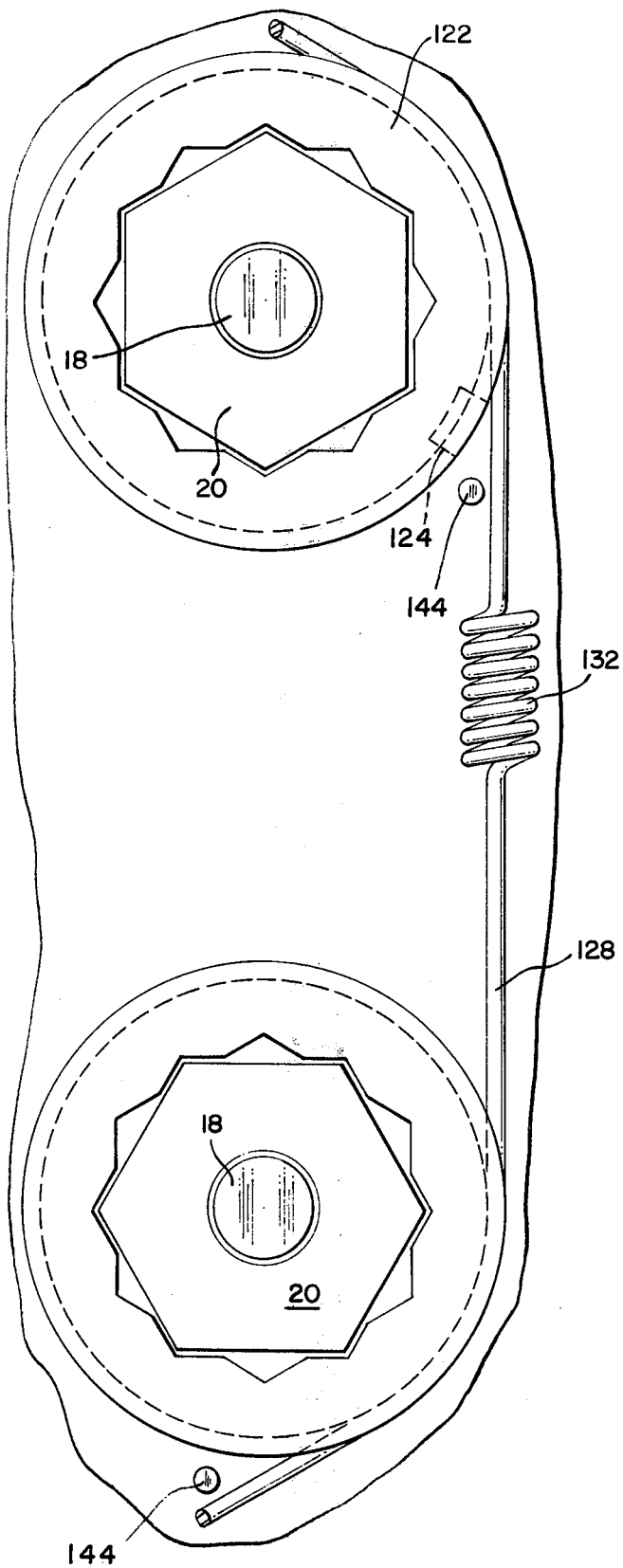
FIG. 5 is a side view of a portion of the device of FIG. 4.
Figure 6:
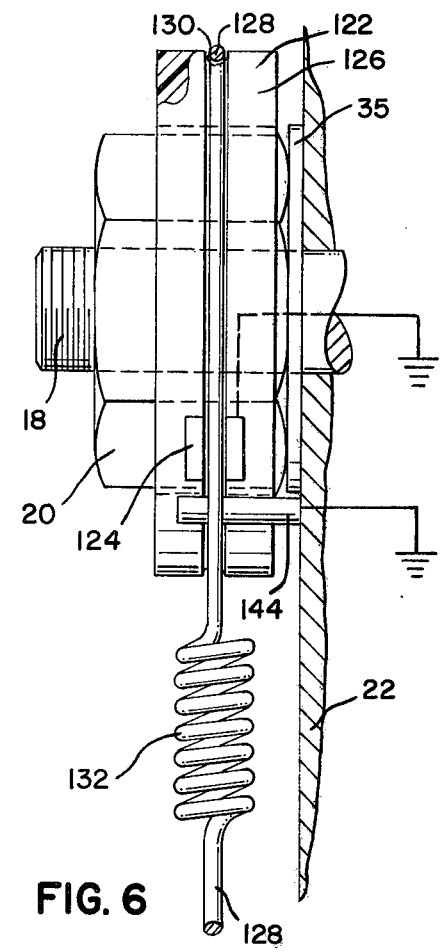
FIG. 6 is a partially broken view of the device of FIG. 5.

Turning to FIG. 1, rotor 44 contains several other conductive portions 48, 50, 52 and 54, for the placement of other alarms not described herein, but full described in my patent application previously identified. FIG. 4 shows another monitoring device used in conjunction with conductive portion 54, to monitor the torque of retainers 20 as well as the integrity of retainers 20 and studs 18. A dielectric collar 122 circumferentially disposes relative to retainer 20, FIGS. 5 and 6. Retainer 20 may have a hexagonal configuration, FIG. 6 or, double the number of sides as shown, for aiding in the torque indexing of retainer 20. An electrically conductive segment 124 is grounded and forms part of the surface 126 of collar 122. A sensing wire 128, itself electrically conductive bears on collar 122. Groove 130 helps the placement of sensing wire 128 such that wire 128 may contact segment 124. Tensing means 132, such as a spring, urges the sensing wire around the dielectric collar. Movement of retainer 20 in a counter-clockwise direction, the loosening direction, would complete the electrical contact of segment 124 with wire 128. As shown on FIG. 4, wire 128 would connect to electrical conduit 134 and hence to conductive portion 54 of rotor 44. A brush 136 contacting portion 54 and biased by spring 138 would transmit the electrical signal through conduit to alarm means 142, connected to power source 88. Thus, a decrease in retainer 20 torque would be monitored by the activation of alarm means 142, Dielectric shield 148 protects the retainers from an electrical short.

A conductive boss 144 electrically grounded, is placed inside the corridor formed by wire 128 around the plurality of collars 122. Movement of sensing wire 128 to the center of wheel 14, with a breaking of stud 18, would cause the wire 128 to contact boss 144. The same alarm means 142, which may be a light as indicated in FIG. 4, would be activated.

Figure 7:
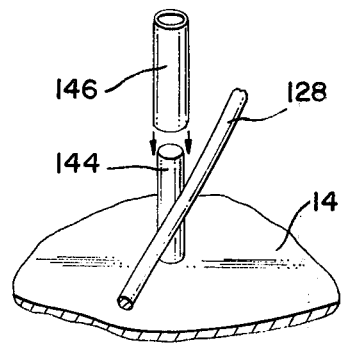
FIG. 7 is a view of the conductive boss of FIG. 5 showing the insertion of a protective cap.

FIG. 7 depicts an insulated cap 146 to prevent wire 128 from setting off alarm means 142 if repair or adjustment is necessary on studs 18 or retainers 20.

In operation, the follower 12 and 60 are mounted to the wheel 14 by using brake drum 24 or any similar bracket fixed to axle 30. A hole is drilled through brake drum 24 to accommodate guide 72. Conductor 64 is positioned between contacts 70 and 90 while contact 82 is positioned to touch conductive portion 46 on first side 56 of rotor 44. Spring 94 holds guide 72 in place. It is understood that followers may be mounted in other ways known to persons skilled in art without the use of guide 72. Contacts 70 and 90 are grounded to hub 22. Riding member 96 is mounted within guide 102 such that contact 112 contacts conductive portion 46 on second side 58 of rotor 44. Conductor 114 is placed to touch contact 118 while conductor 98 is offset from aligned contacts 100 and 108. Biasing means 104 urges riding member, which may be a brush, into its contact heretofore described. Followers 12 and 60 are tested by pushing test member 92 while riding member 96 is tested by pulling test member 120. Sensing wire 128 is wrapped about the collars placed on retainers 20, grounded segment 124 is positioned just clockwise of the sensing wire 128 after the retainers 20 have been torqued as desired. Boss 144 is grounded. Brush 145 contacts portion 54 of the second side 58 of rotor 44 while conduit 134 contacts the same portion on first side 56 of rotor 144. Indicator means 86, signal means 110, and alarm means 142 may be placed in a conveniently viewed panel, such as in the cab compartment of a vehicle. Any breakage, loosening, or lateral movement of the retainers 20 and studs 18 integrity of the axle 30 will be immediately noticed by the various means 86, 110 and 142 performing that function.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. A device to monitor the mounting integrity of a wheel mounting, the wheel having an axle connected to a body and having a plurality of studs including retainers therefor comprising:
   a. first follower having a dielectric periphery, said first follower contacting the wheel, said follower including an electrical conductor spaning the periphery thereof;
   b. first biasing means for urging said first follower into contact with the wheel;
   c. first electrical contact touching said periphery of said first follower, said first electrical contact relatively movable between said dielectric periphery of said first follower and said electrical conductor spanning the periphery of said first follower in touching relationship therewith, said first electrical contact fixed in relation to the wheel axle; and d. monitor means for indicating electrical connection of said first electrical contact and said first follower electrical conductor, said monitor means comprising a second follower having third electrical contact electrically connected to said electrical conductor of said first follower; an electrically conductive rotor having a first side and a second side, disposed about the wheel axle and axially rotatable therewith, said third electrical contacting said first side of said rotor; said first electrical contact connected to ground; second biasing means for urging contact of said third electrical contact of said second follower with said rotor; indicator means for signaling electrical connection between said electrical conductor of said first follower and said first electrical contact, said indicator means electrically connected to said third electrical contact; and a power source for a circuit formed by said first electrical contact, electrical conductor of said first follower, third electrical contact of said second follower, rotor, and indicator means.

2. The device of claim 1 which additionally comprises a second electrical contact touching said periphery of said first follower, said second electrical contact relatively movable between said dielectric periphery of said first follower and said electrical conductor spanning the periphery of said first follower, said second electrical contact fixed in relation to the wheel axle said first and second electrical contacts being spaced away from each other, said second electrical contact positioned a greater distance from the wheel than said first electrical contact.

3. A device to monitor the mounting and bearing integrity of an axle wheel mounted to a body and having a plurality of studs having retainers therefor comprising:

a. rotor disposed about the wheel axle and axially rotatable therewith;

b. riding member contacting said axially rotatable rotor, said member including an electrical conduit spanning the periphery thereof;

c. forcing means for urging said riding member into contact with said rotor;

d. one electrical contact touching said periphery of said riding member, said one electrical contact relatively movable to touch said electrical conduit of said riding member, said one electrical conduit of said riding member, said one electrical contact fixed to the body; and e. alerting means for indicating electrical connection of said one electrical contact and said electrical conduit of said riding member, said alerting means comprising another electrical contact touching said periphery of said riding member, said another electrical contact relatively movable to touch said electrical conduit of said riding member when said one electrical contact touches said electrical conduit of said riding member, said one electrical contact connected to ground; signal means for signaling electrical connection between said electrical conduit of said riding member and said one and another electrical contacts; power source for a circuit formed by said one electrical contact, electrical conduit of said riding member, another electrical contact, and signal means.

4. The device of claim 1 which additionally includes:

a. riding member having a fourth electrical contact electrically contacting the second side of said rotor; said riding member including a first electrical conductor spanning the periphery thereof, said first electrical conductor connected to said fourth electrical contact;

b. third biasing means for urging said riding member into contact with said rotor;

c. fifth electrical contact touching the periphery of said riding member and adapted to electrically contact said first electrical conductor of said riding member, said fifth electrical contact electrically connected to said signal means and affixed to the body; and in which said circuit is formed by said first electrical contact, electrical conductor of said first follower, third electrical contact, rotor, fourth electrical contact, first electrical conductor of said riding member, fifth electrical contact and indicator means.

5. The device of claim 4 in which said riding member has a second electrical conductor spanning the periphery thereof and one and another electrical contacts fixed to the body, said one electrical contact connected to ground and another electrical contact connected to a signal means for signaling electrical conductor and said one and another electrical contacts, said device further including a power source for a circuit formed by said one electrical contact, second electrical conductor of said riding member, another electrical contact and signal means.

6. The device of claim 5 which additionally includes a first test member connected to said first follower to exert a force opposite to said first biasing means.

7. The device of claim 4 which additionally includes a second test member connected to said riding member to exert a force opposite to said third biasing means.

* * * * *